UNITED STATES PATENT OFFICE.

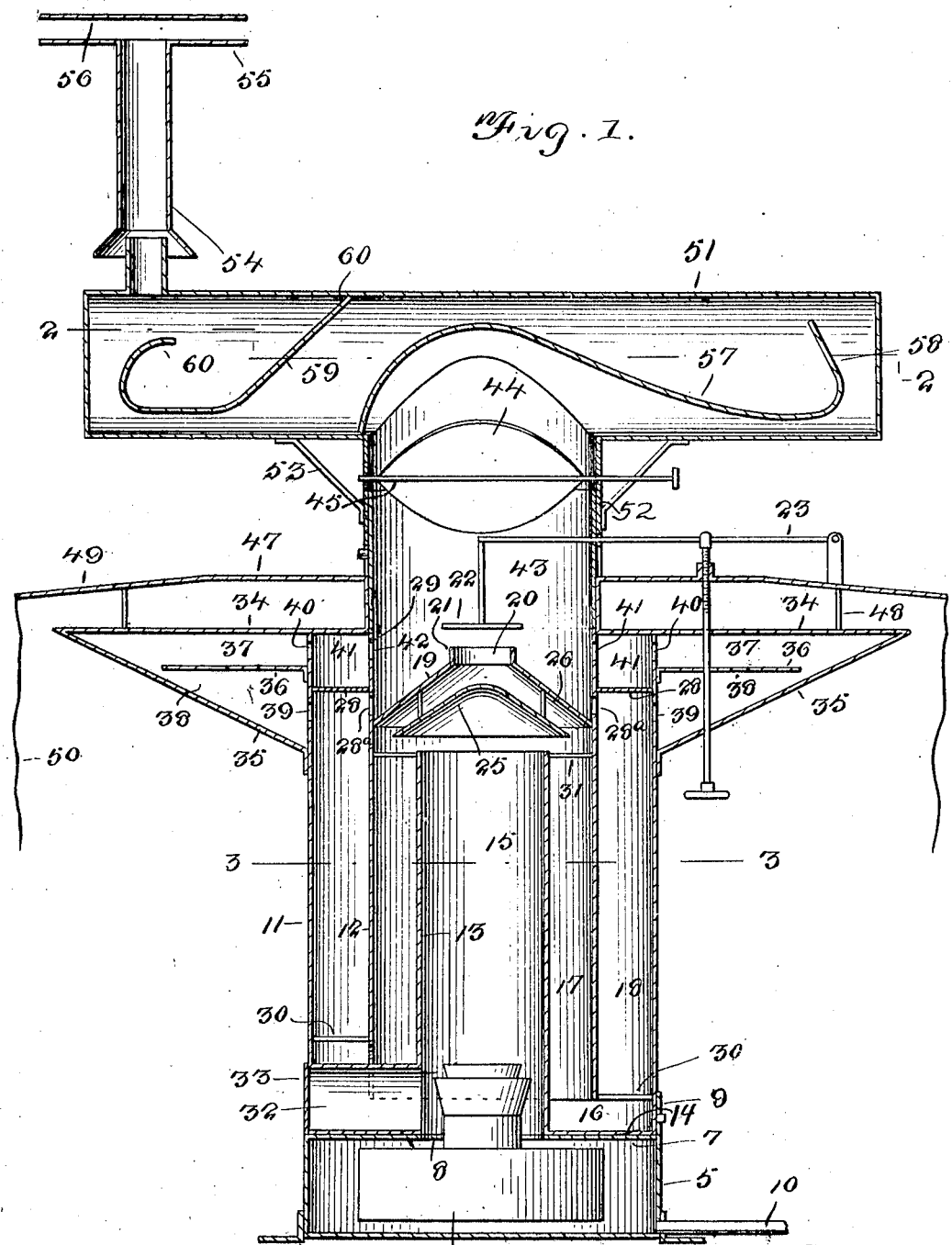

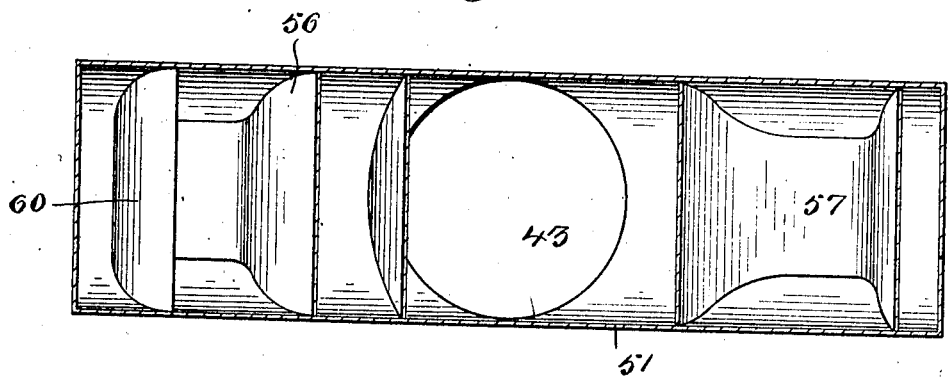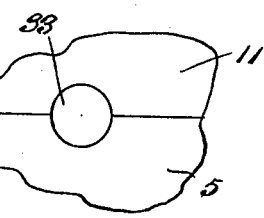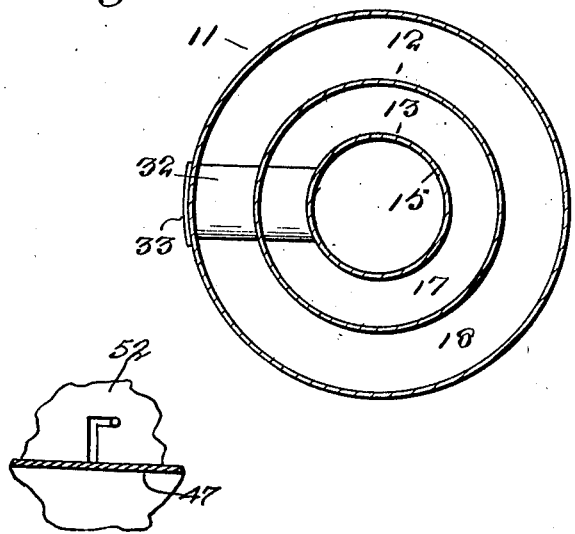

HORACE MANN, OF OLD ALBUQUERQUE, NEW MEXICO.

BROODER.

1,308,717.  Specification of Letters Patent.  Patented July 1, 1919.

Application filed September 14, 1918. Serial No. 254,035.

*To all whom it may concern:*

Be it known that I, HORACE MANN, a citizen of the United States, residing at Old Albuquerque, in the county of Bernalillo and State of New Mexico, have invented new and useful Improvements in Brooders, of which the following is a specification.

This invention relates to poultry brooders, particularly to those of the flame heated type, and has for its object the provision of a device which may be disposed within any suitable coop and which has associated therewith a lamp as a source of heat, the device including a plurality of heating drums so constructed and arranged as to insure an equal distribution of heat to all parts of the device and a thorough circulation of air, the drums having further associated therewith a hover between which and the drum the young poultry may gather in order to obtain the benefit of the maximum amount of heat.

An important object is the provision of a device of this character formed of a plurality of drum sections having suitable valve controlled communication with one another, the different sections being removable so that the device may be efficiently used under different circumstances.

An additional object is the provision of a device of this character which will be simple and inexpensive in manufacture, which is so designed and constructed as to permit association therewith of any suitable or preferred form of heat regulator, which may be readily installed within a coop for converting the coop into a brooder, which will be highly efficient in use, durable in service and a general improvement of the art.

With the above and other objects and advantages in view, the invention consists in the details of construction to be hereinafter more fully described and claimed, and illustrated in the accompanying drawings in which:—

Figure 1 is a longitudinal sectional view through the entire device.

Fig. 2 is a cross sectional view on the line 2—2 of Fig. 1.

Fig. 3 is a cross sectional view on the line 3—3 of Fig. 1.

Fig. 4 is an elevation of the base member taken at right angles to Fig. 1.

Fig. 5 is a fragmentary elevation of the base and adjacent portion of the heating drum, showing the bayonet slot connection, and Fig. 6 is a fragmentary view showing the bayonet slot connection of the additional drum structure with the main portion of the device.

Referring more particularly to the drawings the numeral 5 designates the base of the device which is formed as a cylindrical receptacle within which is disposed any suitable lamp 6. The top wall 7 of the base portion 5 is formed with a central opening 8 through which projects the burner of the lamp. The outer periphery of the base portion 5 has a greater height than the remainder of the base portion so as to provide an upstanding annular flange 9 which is interrupted at a point in its length for a purpose which will be hereinafter described. At this point attention is called to the fact that the lamp 6 forms no part of the present invention as any desired form of lamp may be used provided of course that it be of sufficient size to emit a degree of heat proportionate to the size of the remainder of the device. An air conducting pipe 10 has one end communicating with the atmosphere and has its other end communicating with the interior of the base portion 5 at the bottom thereof. This pipe 10 not only serves to conduct air to the burner but also serves to supply air to the heating drum structure to be described, it being noted that the diameter of the opening made in the top of the base portion is considerably greater than the diameter of the burner whereby to provide a continuous air space around the burner.

Removably associated with the base portion 5 is a heating drum structure including outer, intermediate and inner concentrically arranged drums 11, 12 and 13 respectively. The outer drum 11 is connected with the inner drum 13 by a wall 14 in the nature of a ring-like plate. This heating drum structure is disposed upon the base portion 5 with the bottom wall 14 engaging upon the top wall 7 of the base portion and the outer drum 11 having bayonet slot connection with the inner periphery of the flange 9 formed on the base portion. The diameter of the inner drum 13 is the same as the diameter of the opening 8 in the top wall 7 of the base portion and alined therewith. The interior of the drum 13 forms a heating chamber designated by the numeral 15 which is disposed immediately above the burner of the lamp 6 and which consequently receives direct heat therefrom as long as the lamp is burning. The lower end of the intermediate drum 12 terminates above the bottom plate 14 to provide a space 16 establishing communication between the chambers 17 and 18 defined by the drums 13 and 12, and 12 and 11, respectively. The inner drum 13 is of considerably less height than either the drums 11 or 12, and the space within the intermediate drum 12 above the top of the drum 11 closed by a frusto-conical hood 19 provided with a central opening 20 surrounded by an upstanding flange 21 serving as a seat for a damper plate 22 movable by means of a lever 23 engaged by an operating screw. This specific regulating means forms no essential part of the present invention as it is obvious that any ordinary form of regulating means may be employed at this particular location. A frusto-conical baffle plate 25 is supported below and in spaced relation to the hood 19 and has a diameter less than the diameter of the drum 12 whereby to provide a space 26 between the edge of the baffle plate and the inner wall of the drum 12. In view of the fact that the upper end of the drum 13 is disposed in spaced relation to the baffle plate 25, a space 26 will be provided which establishes communication between the chamber 15 and the chamber 17. At a point below its upper end, the drum 11 is connected with the drum 12 by a ring-like plate 28 which forms a top closure for the chamber 18. The portion of the drum 12 below the plate 28 is provided with openings 28a, and that portion of the drum 12 which extends above the plate 28 constitutes an annular retaining flange 29 for a purpose to be described. The lower end of the drum 12 is supported in spaced relation to the drum 11 by suitable braces 30 and the upper end of the drum 13 is disposed in proper spaced relation to the drum 12 by braces 31. At their lower portions the assembled drums 11, 12 and 13 are provided with a radially extending passage 32 which does not communicate with the chambers 17 and 18 but which is in communication with the chamber 15 and which extends to the cut out portion in the flange 9 of the base portion 5. This passage permits lighting the lamp and is closed by a door 33.

Extending outwardly from the upper end of the drum 12 at a point above the plate 28 is an annular plate 34 to the outer edge of which is secured a downwardly inclined circular plate 35 secured to the drum 11 at a point below the plate 28. A horizontal circular plate 36 is secured to the drum 11 above the plate 28 and extends outwardly terminating short of the juncture of the plates 34 and 35 and dividing the drum formed by these plates into two compartments 37 and 38. The drum 11 is provided with holes 39 and 40 establishing communication between the chamber 18 and compartment 38 and between the compartment 37 and the chamber 41 above the plate 28. The drum 12 above the plate 28 is provided with holes 42 communicating with the chamber 41. The space within the drum 12 above the hood 19 forms a chamber 43 within which is disposed a transversely arranged damper plate 44 mounted upon a spindle 45 provided with a finger engaging head 46. The purpose of this damper is to regulate the passage of heat through the chamber 43.

Disposed upon the upper end of the drum 12 is a hover member comprising a circular plate 47 having suitable connection with the outer periphery of the flange portion 29 of the drum 12, and having secured upon its underside suitable braces 48 bearing upon the top of the plate 34. At its outer periphery, the circular plate 47 is provided with a downwardly extending flange 49 from which depends a cloth canopy member 50 such as is commonly employed in structures of this character.

Removably engaged upon the above described heating drum structures, is an additional drum structure comprising a horizontally disposed cylindrical drum 51 having its bottom wall provided with a central opening surrounded by a depending flange 52 telescopically engaging the portion of the flange 29 above the hover plate 47 and detachably connected therewith by a bayonet slot connection. Braces 53 extend from the flange 52 and are secured to the drum 51. An upwardly extending flue or chimney 54 communicates with the interior of the drum 51 and is mounted upon the top wall thereof adjacent its outer periphery. At its upper end, the flue or chimney 54 is provided with an outwardly extending flange 55 above which is disposed in spaced relation thereto a top plate 56.

In order to prevent heat entering the drum 51 from escaping too quickly through the flue 54, I provide a serpentine baffle plate 57 disposed within the drum 51 and having one end disposed at one edge of the central opening therein and having its other end terminating in spaced relation to the top wall of the drum 51 adjacent the outer periphery thereof as shown at 58, the intermediate portion of the baffle plate being inclined upwardly from the edge of the central opening and reaching a maximum height at a point immediately above the center of the opening, from which point the baffle plate again inclines downwardly toward the outer wall of the drum. In further carrying out this same purpose, I provide a second baffle plate 59 spaced from the plate 57 and terminating at a point substantially diametrically opposite the point 58 of the plate 57 as shown at 60. The other or upper end of the plate 57 is secured to the underside of the top wall of the drum 51 as shown at 61.

The entire device being assembled as above described, the operation is as follows: When the burner of the lamp 6 is lighted, the air initially within the lower portion of the chamber 15 will become heated and will rise, drawing in fresh air through the pipe 10. This pipe 10 consequently supplies fresh air to the device as long as the flame is in existence. When the heat regulating member including the plate 22 is operated to elevate the plate 22, the heated air rising within the chamber 15 will strike against the conical baffle plate 25 and will be directed to the passage 26 surrounding the outer edge of the baffle plate 25, whereupon the heat will rise between the hood 19 and plate 25 and will pass through the opening 20 into the chamber 43 from which it will pass into the drum 51, impinging against the baffle plate 57 and passing under the plate 57 to the outer edge of the drum, then upwardly to the top wall of the drum and across to the baffle plate 59, along the underside of the plate 59 and then upwardly and around the point 60, and upwardly through the flue or chimney 54 and out through the space between the flange 55 and plate 56 into the atmosphere. The above described circulation of the heated air will result in the drum 51 being effectively heated for heating the coop within which the brooder is disposed. The above described circulation will however, not effect any appreciable heating of the outermost drum 11 and will consequently not be particularly effective for heating the space within the hover and canopy. When it is desired to attain a greater degree of heat within the hover, it is necessary that the controlling device be operated to lower the plate 22 into substantial engagement with the upper end of the flange 21, closing the opening 20 in the hood 19. The heated air rising within the chamber 15 will then upon impinging against the baffle plate 25, be deflected downwardly through the space at the upper end of the drum 13 and into the chamber 17 between the drums 12 and 13, downwardly and through the space 16 at the lower end of the drum 12, upwardly through the chamber 18 between the drums 11 and 12. Upon reaching the cover plate 28 connecting the drums 11 and 12, a portion of the air will pass through the openings 28ᵃ and into the chamber 43, whence it will pass into the drum 51 and out through the flue 54 as previously described. The remainder of the heated air will pass through the holes 39, into the compartment 38, around the edge of the plate 36 into the compartment 37, through the holes 40 into the chamber 41, and then through the holes 42 into the chamber 43. This circulation consequently heats the space beneath the hover very effectually. Furthermore, adjustment of the damper plate 44 within the chamber 43 regulates the rate of flow of the heated air from the chamber 43 into the drum 51 as will be obvious.

If it should be desired at any time to dispense with the use of the upper drum 51, this drum may be removed by disengaging the flange 52 from the flange 29. When this drum is thus removed, the device is adaptable for use merely as a hover in which capacity it may have great efficiency in view of the specially designed means for supplying heat to the outer drum 11 and consequently to the space beneath the plate 47 and within the flange 49 and canopy 50. When it is necessary to fill or repair the lamp 6, or if for any other reason it is desired to remove the lamp 6, both of the heating drum members may be readily removed from the base portion 5 by removing the drum 11 and the associated parts from engagement with the flange 9 carried by the base portion.

From the foregoing description and a study of the drawings it will be apparent that I have thus provided a very simple and efficient heating device whereby a coop may be converted into a brooder and which is provided with means whereby the degree of heat for heating the entire coop may be readily regulated and additionally provided with means whereby the degree of heat within the hover portion may be almost entirely cut off or regulated at will to meet various conditions.

While I have shown and described the preferred embodiment of the invention, it will of course be readily understood that I reserve the right to make such changes in the form, construction and arrangement of parts as will not depart from the spirit of the invention nor the scope of the subjoined claims.

Having thus described my invention I claim:—

1. A device of the character described comprising a hollow supporting base provided with an air inlet, a lamp within said base, an upstanding flange on said base, a drum device mounted upon said base and detachably engaged with said flange and including a plurality of staggered sections, an upstanding flange formed at the upper end of said drum member, a hover member including a circular top plate having a central opening surrounded by a flange engaging upon said flange upon said drum member, a depending flange in the outer periphery of said circular plate, a canopy depending from said last named flange and concentric with said drum member, a relatively large drum member telescopically engaged upon the flange on said first named drum, said last named drum being of greater diameter than said first named drum member and of less diameter than said hover member, and an outlet pipe communicating with said last named drum.

2. A device of the character described comprising a supporting base formed hollow and provided with an inlet opening, a lamp within said base, a main drum member mounted upon said base and including inner intermediate and outer drums, the inner drum being connected at its lower end with the lower end of the outer drum and the intermediate drum terminating short of the lower ends of said inner and outer drums, said inner drum being disposed above said burner and having its upper end terminating below the upper end of said intermediate and outer drums, a plate connecting the upper end of said outer drum with the intermediate drum at a point above the upper end of said inner drum, said intermediate drum being provided with a plurality of openings communicating with the interior of the outer drum above the upper end of said inner drum, a frusto-conical hood member disposed within said intermediate drum above the upper end of said inner drum and provided with an outlet opening, a conical baffle plate disposed below and in spaced relation to said hood and arranged above the upper end of said inner drum, and a regulator plate disposed above said hood and movable to close the opening therein.

3. A device of the character described comprising a supporting base provided with an air inlet, a lamp within said base, a drum mounted on said base and receiving heat from said lamp, a second drum of relatively large diameter disposed above and communicating with said first named drum, an outlet pipe communicating with the top of said last named drum adjacent the periphery thereof, a serpentine baffle plate within said last named drum secured at one end upon the bottom thereof and curved upwardly and bent downwardly over the area of communication with the first named drum, the outer end of said plate terminating at a point diametrically opposite the point of communication of said flue and in spaced relation to the top, bottom and outer walls of the drum and a second serpentine baffle plate secured at one end upon the underside of the top wall of the last named drum and having its other end terminating below the point of communication of said outlet flue, the intermediate portion of said last named baffle plate being inclined downwardly and being in spaced relation to the bottom wall of the drum.

In testimony whereof I affix my signature.

HORACE MANN.